United States Patent
Kim (10) Patent No.: US 10,979,912 B2
(45) Date of Patent: Apr. 13, 2021

(54) VEHICLE INCLUDING ANTENNA APPARATUS AND CONTROL METHOD THEREOF

(71) Applicants: HYUNDAI MOTOR COMPANY, Seoul (KR); KIA MOTORS CORPORATION, Seoul (KR)

(72) Inventor: Dongjin Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 148 days.

(21) Appl. No.: 16/377,649

(22) Filed: Apr. 8, 2019

(65) Prior Publication Data
US 2020/0137587 A1    Apr. 30, 2020

(30) Foreign Application Priority Data

Oct. 25, 2018    (KR) .................. 10-2018-0128122

(51) Int. Cl.
| | | |
|---|---|---|
| *H04B 1/00* | (2006.01) |
| *H04W 16/28* | (2009.01) |
| *H04W 4/40* | (2018.01) |
| *H04W 24/02* | (2009.01) |
| *H01Q 15/24* | (2006.01) |
| *H01Q 3/02* | (2006.01) |
| *H01Q 1/32* | (2006.01) |

(52) U.S. Cl.
CPC ............ *H04W 16/28* (2013.01); *H01Q 15/24* (2013.01); *H04W 4/40* (2018.02); *H04W 24/02* (2013.01); *H01Q 1/3208* (2013.01); *H01Q 3/02* (2013.01)

(58) Field of Classification Search
CPC ..... H04W 72/04; H04W 16/28; H04W 40/02; H04W 4/40; H04W 64/00; H04W 72/046; H04W 88/02; H01Q 21/245; H01Q 5/35; H01Q 1/243; H01Q 1/3275; H01Q 3/08; H01Q 15/24; H01Q 1/00; H01Q 1/3208; H01Q 3/02
See application file for complete search history.

(56) References Cited

U.S. PATENT DOCUMENTS

| | | | | |
|---|---|---|---|---|
| 2010/0259443 | A1* | 10/2010 | Kwak ............... | H01Q 3/08 342/352 |
| 2016/0272154 | A1* | 9/2016 | Sanji ............... | G07C 9/00 |
| 2017/0272873 | A1* | 9/2017 | Webster ........... | H04R 25/55 |
| 2018/0054088 | A1* | 2/2018 | Zeine ............... | H04B 5/0037 |

* cited by examiner

*Primary Examiner* — Nhan T Le
(74) *Attorney, Agent, or Firm* — Morgan, Lewis & Bockius LLP

(57) ABSTRACT

A vehicle includes: an antenna; a polarization adjuster configured to change a first polarized wave emitted through the antenna; and a controller configured to receive a wireless signal from a portable user device through the antenna, to identify a second polarized wave emitted from the portable user device based on the wireless signal, and to control the polarization adjuster such that the first polarized wave matches the second polarized wave.

17 Claims, 9 Drawing Sheets

VEHICLE INCLUDING ANTENNA APPARATUS AND CONTROL METHOD THEREOF

CROSS-REFERENCE TO RELATED APPLICATION

This application is based on and claims priority to Korean Patent Application No. 10-2018-0128122, filed on Oct. 25, 2018 in the Korean Intellectual Property Office, the disclosure of which is incorporated herein by reference.

TECHNICAL FIELD

The present disclosure relates to a vehicle including an antenna apparatus and a control method thereof, and more specifically, to a vehicle including an antenna apparatus for communicating with a user device carried by a pedestrian and a control method thereof.

BACKGROUND

Generally, a vehicle refers to a device for movement or a device for transportation, designed to run on a road or railway using fossil fuel, electric power, and the like as a power source.

Such a vehicle is not only able to transport commodities and passengers but also provides various functions, for example, a function that allows a driver to listen to music and watch an image while driving, and a function that allows a driver to navigate, using an audio video navigation (AVN) system.

In addition, there is an increasing need for a vehicle to communicate with an external device such as vehicle-to-everything (V2X) communication. For example, a vehicle may acquire traffic information on a road through a communication with transportation infrastructure such as vehicle-to-infrastructure (V2I) communication, and may acquire running information of another vehicle through communication with another vehicle such as vehicle-to-vehicle (V2V) communication.

In addition, a vehicle may acquire information about movement of a pedestrian through communication with a pedestrian, that is, vehicle-to-pedestrian (V2P) communication.

Particularly, the V2P communication for communicating with a pedestrian relies on a user device that may vary in position and posture every moment, unlike the V2I communication for communicating with transportation infrastructure having a fixed posture and a fixed position or the V2V communication for communicating with another vehicle having a fixed posture. Accordingly, the communication between the vehicle and the user device, i.e., V2P communication, may have poor stability.

SUMMARY

An object of the present disclosure is to provide a vehicle including an antenna apparatus capable of improving the communication efficiency with a pedestrian, and a control method thereof.

Another object of the present disclosure is to provide a vehicle including an antenna apparatus capable of identifying a polarized wave emitted from a user device according to a position and posture of the user device in vehicle-to-pedestrian communication (V2P) communication, and a control method thereof.

Still another object of the present disclosure is to provide a vehicle including an antenna apparatus capable of controlling a polarized wave emitted from the antenna apparatus on the basis of a polarized wave emitted from a user device carried by a pedestrian in the V2P communication, and a control method thereof.

Additional aspects of the disclosure will be set forth in part in the description which follows and, in part, will be obvious from the description, or may be learned by practice of the disclosure.

According to an exemplary embodiment of the present disclosure, a vehicle includes: an antenna; a polarization adjuster configured to change a first polarized wave emitted through the antenna; and a controller configured to receive a wireless signal from a portable user device through the antenna, to identify a second polarized wave emitted from the portable user device on the basis of the wireless signal, and to control the polarization adjuster such that the first polarized wave matches the second polarized wave.

The wireless signal received from the portable user device may include information about the second polarized wave.

The information about the second polarized wave may be obtained from a posture of the portable user device.

The wireless signal received from the portable user device may include information about a posture of the portable user device.

The polarization adjuster may include a driving motor configured to rotate the antenna.

The controller may control the driving motor such that the first polarized wave matches the second polarized wave.

The antenna may include a plurality of polarization antennas and the polarization adjuster may include a switch configured to connect at least one of the plurality of polarization antennas to the controller.

The controller may control the switch to connect a polarization antenna, through which a third polarized wave that matches the second polarized wave is emitted, among the plurality of polarization antennas to the controller.

The controller may determine whether the first polarized wave matches the second polarized wave.

The controller may control the polarization adjuster when the first polarized wave does not match the second polarized wave.

The controller may process the wireless signal from the portable user device when the first polarized wave matches the second polarized wave.

According to another exemplary embodiment of the present disclosure, a method of controlling a vehicle, which includes an antenna and a polarization adjuster configured to change a first polarized wave emitted through the antenna, includes steps of: receiving a wireless signal from a portable user device through the antenna; identifying a second polarized wave emitted from the portable user device on the basis of the wireless signal; and controlling the polarization adjuster such that the first polarized wave matches the second polarized wave.

The wireless signal received from the portable user device may include information about the second polarized wave.

The information about the second polarized wave e may be obtained from a posture of the portable user device.

The wireless signal received from the portable user device may include information about a posture of the portable user device.

The step of controlling the polarization adjuster may include controlling such that the first polarized wave matches the second polarized wave.

The step of controlling the polarization adjuster may include controlling a switch to select a polarization antenna, through which a third polarized wave that matches the second polarized wave is emitted, among the plurality of polarization antennas.

The method may further include determining whether the first polarized wave matches the second polarized wave.

The method may further include controlling the polarization adjuster when the first polarized wave does not match the second polarized wave.

The method may further include processing the wireless signal from the portable user device when the first polarized wave matches the second polarized wave.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, or c," should be understood as including only a, only b, only c, both a and b, both a and c, both b and c, or all of a, b, and c.

Hereinafter, the operating principles and embodiments of the disclosure will be described with reference to the accompanying drawings.

Figure 1:
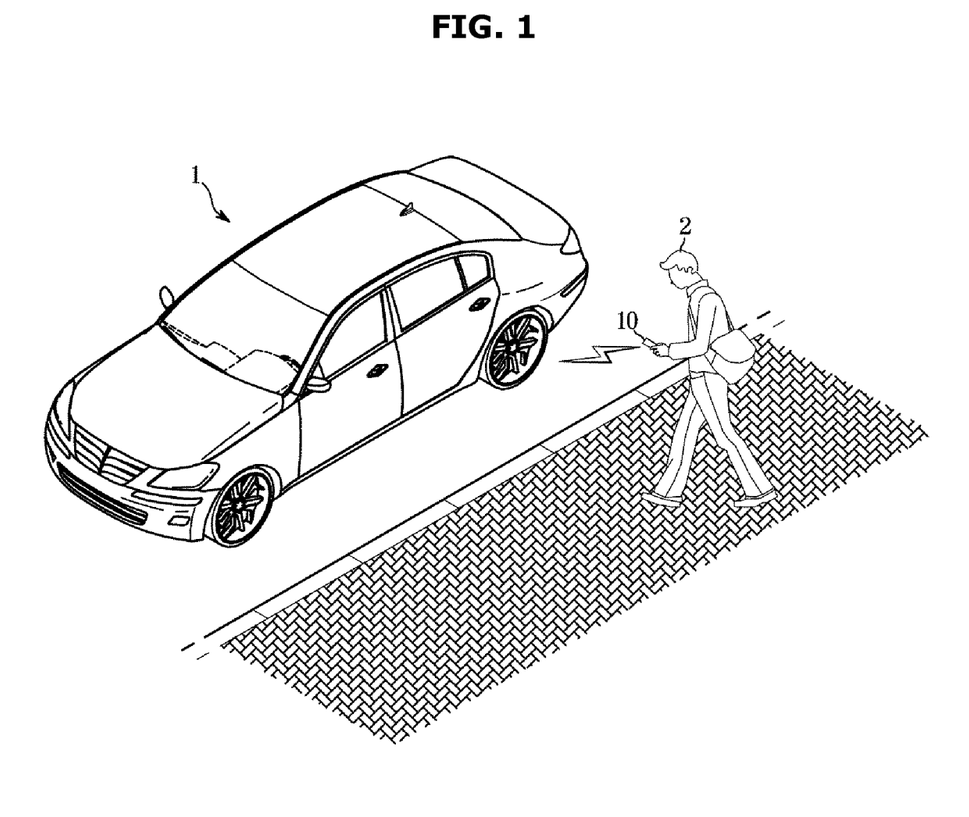
FIG. 1 illustrates a vehicle and a pedestrian according to an embodiment of the present disclosure.
Figure 2A:
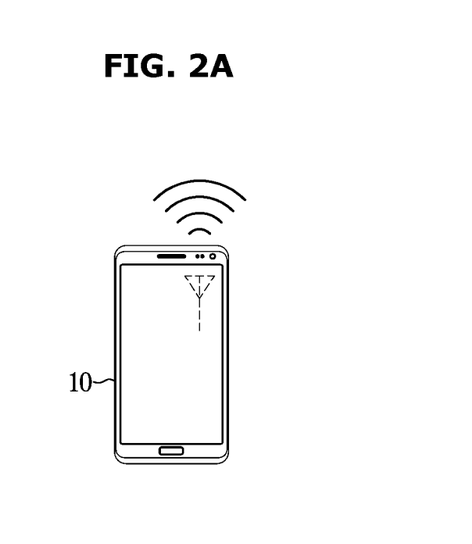
FIGS. 2A and 2B illustrate examples of the posture of a user device according to one embodiment of the present disclosure.
Figure 2B:
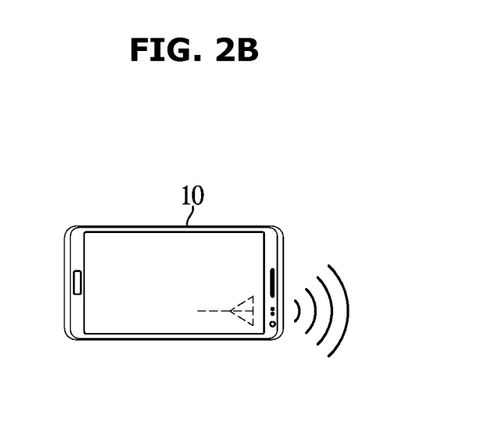
Figure 3:
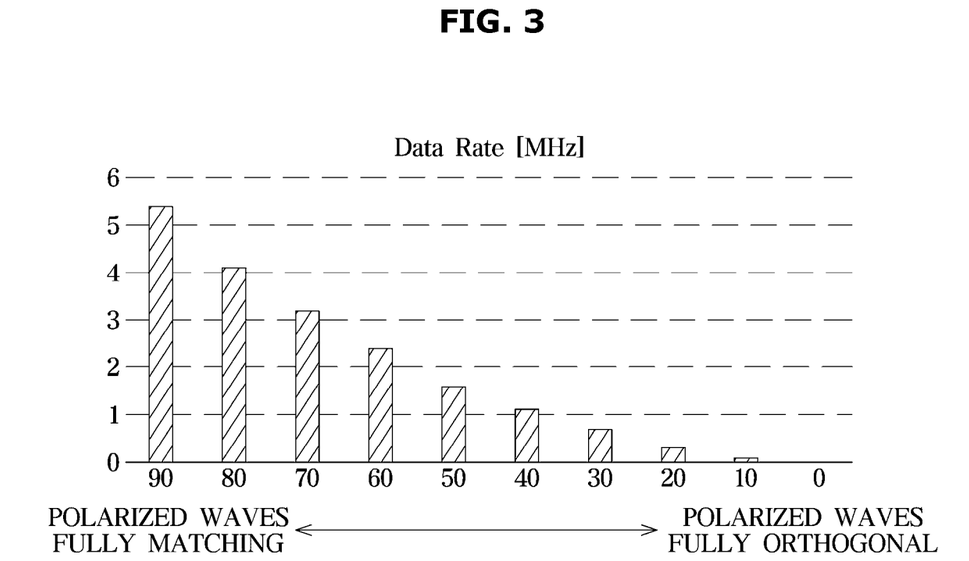
FIG. 3 illustrates a communication speed (data transmission rate) according to the degree of matching between a polarized wave of a vehicle and a polarized wave of a user device according to an embodiment of the present disclosure.

FIG. 1 illustrates a vehicle and a pedestrian according to an embodiment of the present disclosure. FIGS. 2A and 2B illustrate examples of the posture of a user device according to one embodiment of the present disclosure. FIG. 3 illustrates a communication speed (data transmission rate) according to the degree of matching between a polarized wave of a vehicle and a polarized wave of a user device according to an embodiment of the present disclosure.

Referring to FIG. 1, a vehicle 1 may communicate with a user device 10 carried by a pedestrian 2.

The vehicle 10 may refer to a device for movement or transportation that runs on a road or a railroad using fossil fuel, electricity, and the like as a power source. In addition, the vehicle 1 may communicate wirelessly with other devices (e.g., transportation infrastructure, another vehicle, and another user device) through a communication device.

The user device 10 may be implemented using various types of communication devices or electronic devices that may be carried or worn by the pedestrian 2. For example, the user device 10 may be a portable terminal, a multimedia terminal, a personal information terminal, a tablet computer, a laptop computer, a smart watch, smart glasses, and the like.

The vehicle 1 having one or more processors may acquire information about the pedestrian 2 through communication with the user device 10 of the pedestrian 2. For example, the vehicle 1 acquires a relative position of the pedestrian 2, the moving speed of the pedestrian 2, a moving direction of the pedestrian 2, and the like through communication with the user device 10 of the pedestrian 2. The vehicle 1 may calculate a collision probability with the pedestrian 2 on the basis of information about motion of the pedestrian 2 and may warn a driver about a collision with the pedestrian 2 on the basis of the collision probability with the pedestrian 2.

In addition, the vehicle 1 may communicate with another device in a multi-hop scheme using the user device 10.

The user device 10 may acquire information about the vehicle 1 through communication with the vehicle 1. For example, the user device 10 may acquire the position of the vehicle 1, the moving speed of the vehicle 1, the moving direction of the vehicle 1, and the like through communication with the vehicle 1. The user device 10 may calculate the collision probability with the vehicle 1 and warn the pedestrian 2 about a collision with the vehicle 1 on the basis of the collision probability with the vehicle 1.

The vehicle 1 may communicate wirelessly with the user device 10. For example, the vehicle 1 emits a wireless signal to the free space through an antenna, and the user device 10 may receive the wireless signal of the vehicle 1 from the free space through an antenna. The wireless signal may be transmitted in the form of electromagnetic waves or radio waves.

In this case, the vehicle 1 maintains a fixed posture, and thus, the emitting direction of a radio wave (or an electromagnetic wave) emitted by the antenna of the vehicle 1 may be constant and the antenna of the vehicle 1 can emit a constant polarized wave.

On the other hand, the user device 10 may be moved in various directions depending on the posture and the movement of the pedestrian 2, and the user device 10 may have various postures depending on the posture of the pedestrian 2 carrying the user device 10.

For example, the user device 10 may be placed with the top directed upward as shown in FIG. 2A, or may be placed with the top directed sideway as shown in FIG. 2B.

Depending on the posture of the user device 10, the antenna of the user device 10 may emit various polarized waves.

For example, when the user device 10 is placed with the top directed upward as shown in FIG. 2A, the antenna of the user device 10 may emit a first polarized wave (e.g., a horizontal polarized wave). When the user device 10 is placed with the top directed sideway, the antenna of the user device 10 may emit a second polarized wave (e.g., a vertical polarized wave).

As such, the polarization of the vehicle 1 may be fixed, and the polarization of the user device 10 may change from time to time. The polarized wave of the vehicle 1 and the polarized wave of the user device 10 may be different from each other and thus communication between the vehicle 1 and the user device 10 may not be performed smoothly. For example, when the polarized wave of the vehicle 1 and the polarized wave of the user device 10 are orthogonal to each other, communication between the vehicle 1 and the user device 10 may be blocked.

Referring to FIG. 3, the communication speed (data transmission rate) may vary depending on the degree of matching between the polarized waves of the vehicle 1 and the polarized waves of the user device 10.

For example, assuming that the maximum communication speed between the vehicle 1 and the user device 10 is about 5.5 Mbps (mega-bits per second), the communication speed between the vehicle 1 and the user device 10 may reach about 5.5 Mbps when the polarized wave of the vehicle 1 matches the polarized wave of the user device 10 with a match rate of about 90% or more, and the communication speed between the vehicle 1 and the user device 10 may reach about 4.1 Mbps when the polarized wave of the vehicle 1 matches the polarized wave of the user device 10 with a match rate of about 80%. As such, as the degree of matching between the polarized wave of the vehicle 1 and the polarized wave of the user device 10 is lowered, the communication speed between the vehicle 1 and the user device 10 may decrease. When the polarized wave of the vehicle 1 matches the polarized wave of the user device 10 with a match rate of about 10%, the communication speed between the vehicle 1 and the user device 10 may be about 0.1 Mbps.

When the polarized wave of the vehicle 1 and the polarized wave of the user device 10 are orthogonal to each other, the communication speed between the vehicle 1 and the user device 10 may be 0 Mbps. In other words, when the polarized wave of the vehicle 1 and the polarized wave of the user device 10 are orthogonal to each other, communication between the vehicle 1 and the user device 10 may be blocked.

The vehicle 1 may control the antenna of the vehicle 1 to change the polarized wave emitted from the vehicle 1 such that communication with the user device 10 is maintained and the communication speed with the user device 10 is improved. For example, the vehicle 1 may change the posture of the antenna such that the direction in which the antenna is oriented, or may select one of the plurality of antennas having different polarizations.

The user device 10 may transmit information about the polarized wave of the user device 10 or information about the posture of the user device 10 to the vehicle 1 to maintain the communication with the vehicle 1 and improve the communication speed with the vehicle 1. The vehicle 1 may receive the information about the polarized wave of the user device 10 or the information about the posture of the user device 10 from the user device 10, and control the antenna to change the polarized wave emitted from the vehicle 1 depending on the information about the polarized wave of the user device 10 or the information about the posture of the user device 10.

Hereinafter, the configuration and operation of the vehicle 1 and the user device 10 will be described.

Figure 4:
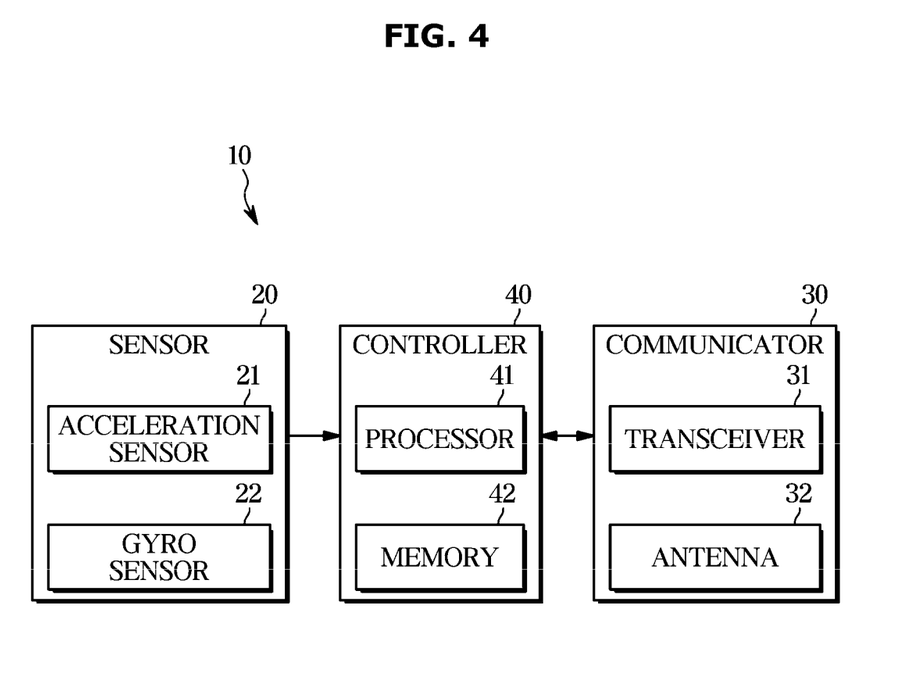
FIG. 4 illustrates a configuration of a user device according to an embodiment of the present disclosure.
Figure 5A:
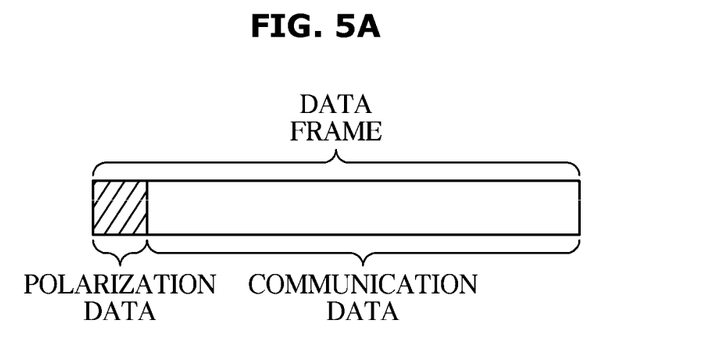
FIGS. 5A, 5B, and 5C illustrate examples of a signal transmitted from a user device to a vehicle according to an embodiment of the present disclosure.
Figure 5B:
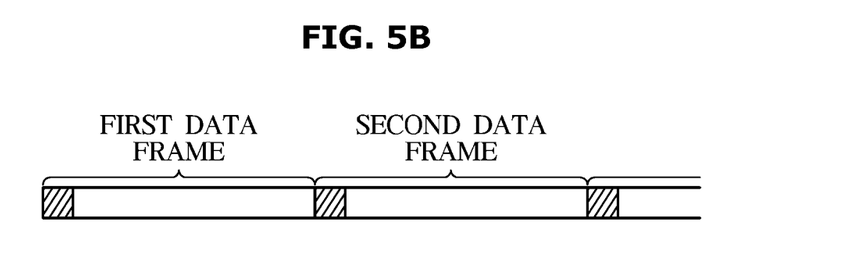
Figure 5C:
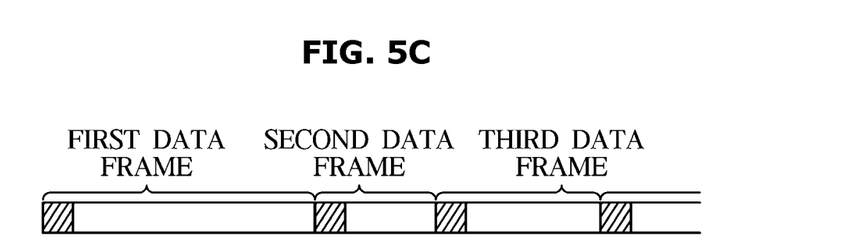

FIG. 4 illustrates a configuration of a user device according to an embodiment. FIGS. 5A, 5B, and 5C illustrate examples of a signal transmitted from a user device to a vehicle according to an embodiment.

Referring to FIGS. 4, 5A, 5B, and 5C, the user device 10 includes a sensor 20, a communicator 30, and a controller 40.

The sensor 20 may include an acceleration sensor 21 and a gyro sensor 22 for sensing the movement of the user device 10.

The acceleration sensor 21 and the gyro sensor 22 may measure the acceleration, the moving velocity, the moving displacement, and the moving direction of the user device 10 while the user device 10 is moving linearly. In addition, the acceleration sensor 21 and the gyro sensor 22 may measure the rotational velocity, the rotational displacement, and the turning radius of the user device 10, while the user device 10 is rotating.

The acceleration sensor 21 may sense a linear movement. For example, the acceleration sensor 21 may measure linear acceleration, linear velocity, and linear displacement of the user device 10 using the Newton's second law of motion (law of acceleration).

The acceleration sensor 21 may include a micro electro mechanical system (MEMS) type sensor that is provided in a compact size by combining micromechanics, microelectronics, and semiconductor process technologies.

The gyro sensor 22 is referred to as a gyroscope or an angular velocity sensor and detects the rotational movement of the user device 10. In detail, the gyro sensor 22 may measure the rotational angular velocity and the rotational displacement of a detection target using the law of conservation of angular momentum, the Sagnac effect, the Coriolis force, and the like.

The gyro sensor 22 may also include a MEMS type sensor. For example, a capacitance gyro sensor among the MEMS type gyro sensors may detect a deformation of a micro-mechanical structure due to Coriolis force proportional to a rotation speed as a change in capacitance, and calculate a rotation speed from the change in capacitance.

The communicator 30 may include a transceiver 31 and an antenna 32 that wirelessly transmit signals to the vehicle 1 and wirelessly receive signals from the vehicle 1.

The transceiver 31 modulates digital communication data into a high frequency analog communication signal and demodulates a high frequency analog communication signal received by the antenna 32 into digital communication data.

The transceiver 31 may modulate the digital communication data and demodulate the high frequency analog communication signal using various communication schemes.

The transceiver 31 may use a mobile communication scheme. For example, the transceiver 31 may use a second generation (2G) communication system, such as time division multiple access (TDMA) and code division multiple access (CDMA), a third generation (3G) communication scheme, such as wide code division multiple access (WCDMA), code division multiple access (CDMA2000), wireless broadband (WIBRO) and world interoperability for microwave access (WiMAX), a fourth generation (4G) communication scheme, such as long term evolution (LTE) and wireless broadband evolution, or a fifth generation (5G) communication scheme.

In addition, the transceiver 31 may use a short-range communication scheme. For example, the transceiver 31 may use a dedicated short range communication (DSRC) communication scheme, a wireless access in vehicular environments (WAVE) communication scheme, or a wireless fidelity (WiFi) communication scheme.

The antenna 32 may emit an electromagnetic wave (a radio wave) corresponding to a high frequency analog communication signal to the free space, and in response to receiving an electromagnetic wave from the free space, output a high frequency analog communication signal corresponding to the received electromagnetic wave. In particular, the antenna 32 may emit a specific polarized wave to the free space and receive a specific polarized wave from the free space.

The antenna 32 may have various shapes and various sizes depending on the frequency of analog signals and/or electromagnetic waves to be transmitted and received. For example, the antenna 32 may include a dipole antenna, a monopole antenna, a patch antenna, a parabola antenna, a helical antenna, a yagi antenna, a slot antenna, an array antenna, and the like.

The controller 40 includes a processor 41 and a memory 42 for generating a control signal for controlling the sensor 20 and the communicator 30.

The processor 41 may generate digital communication data to be transmitted to the vehicle 1 through the communicator 30. The digital communication data may include information to be transmitted from the user device 10 to the vehicle 1. For example, the digital communication data may include a response message for responding to a message of the vehicle 1, or may include a request message for requesting information regarding the movement of the vehicle 1.

The processor 41 may generate polarization data on the basis of information about the movement and posture of the user device 10 sensed by the sensor 20. In detail, the processor 41 may identify the movement and posture of the user device 10 from an output of the sensor 20, and identify a polarized wave transmitted and received through the antenna 32 on the basis of the movement and posture of the user device 10. For example, the processor 41 may identify whether the polarized wave transmitted and received through the antenna 32 is a vertical polarized wave or horizontal polarized wave on the basis of the movement and posture of the user device 10.

The processor 41 may generate polarization data representing an identified polarized wave.

For example, the processor 41 may generate polarization data on the basis of the product of a basic polarized wave of the user device 10 and an output of the sensor 20 as shown in Equation 1.

$$\alpha = \beta * \theta \qquad \text{[Equation 1]}$$

Here, α represents a polarized wave of the user device 10, β represents a basic polarized wave of the user device 10, and θ represents the posture of the user device 10 (the direction in which the user device 10 is oriented).

The processor 41 may generate a data frame including polarization data and communication data as shown in FIG. 5A. In addition, the processor 41 may transmit the data frame to the communicator 30.

The processor 41 may allow the communication data combined with the polarization data to have a predetermined bit number or a variable bit number.

For example, the processor 41 may generate the polarization data every predetermined time, and combine the polarization data generated every predetermined time with the communication data. Thus, the polarization data may be combined with the communication data having a predetermined length, and the length (bit number) of a first data frame and the length (bit number) of a second data frame may be the same as each other as shown in FIG. 5B.

As another example, the processor 41 may generate polarization data whenever motion (movement or change in posture) of the vehicle 10 is sensed, and combine the generated polarization data with communication data. Accordingly, the polarization data may be combined with the communication data having a variable length, and the length (bit number) of a first data frame and the length (bit number) of a second data frame may be different from each other as shown in FIG. 5C. At this time, shorter communication data represents that the movement or change in posture of the user device 10 more frequently occurs, and longer communication data represents that the movement or change in posture of the user device 10 less frequently occurs.

As such, the processor 41 may generate the polarization data representing the movement and posture of the user device 10.

The memory 42 may store instructions (a program) and data for controlling the operation of the user device 10, and may provide the stored program and data to the processor 41. For example, the memory 42 may store instructions (a program) and data for implementing the above described operations of the processor 41.

The memory 42 may temporarily memorize information about the movement and posture of the user device 10 sensed by the sensor 20, and may temporarily memorize the data frame processed by the processor 41.

The memory 42 may include not only a volatile memory, such as an S-RAM and a D-RAM, but also a non-volatile memory, such as a flash memory, a read only memory (ROM), an erasable programmable read only memory (EPROM), and the like.

As described above, the user device 10 may communicate with the vehicle 1 and transmit polarization data including information about a polarized wave that is emitted from the user device 10 to the vehicle 1.

Figure 6:
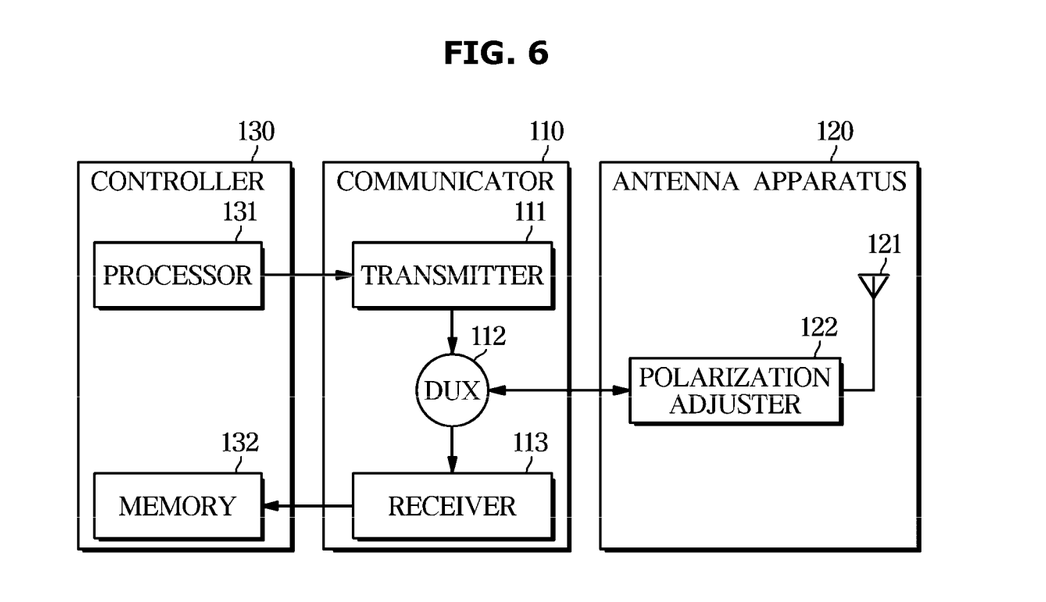
FIG. 6 illustrates a configuration of a vehicle according to an embodiment of the present disclosure.

FIG. 6 illustrates a configuration of a vehicle according to an embodiment. FIGS. 7A, 7B, 7C, and 7D illustrate examples of an antenna apparatus included in a vehicle according to an embodiment. FIG. 8 illustrates an example of an antenna apparatus included in a vehicle according to another embodiment.

Referring to FIGS. 6, 7A, 7B, 7C, 7D, and 8, the vehicle 1 includes a communicator 110, an antenna apparatus 120, and a controller 130.

The communicator 110 includes a transmitter 111, a transmit-receive switcher 112, and a receiver 113.

The transmitter 111 may convert digital communication data into a low frequency analog communication signal according to a control signal of the controller 130. In addition, the transmitter 111 may modulate the low frequency analog communication signal into a high frequency analog communication signal using a high frequency signal of a local oscillator.

The transmitter 111 may modulate digital communication data using various communication schemes. For example, the transmitter 111 may use a second generation (2G) communication system, such as time division multiple access (TDMA) and code division multiple access (CDMA), a third generation (3G) communication scheme, such as wide code division multiple access (WCDMA), code division multiple access (CDMA2000), wireless broadband (WIBRO) and world interoperability for microwave access (WiMAX), a fourth generation (4G) communication schemes, such as long term evolution (LTE) and wireless broadband evolution, or a fifth generation (5G) communication scheme. In addition, the transmitter 111 may use a dedicated short range communication (DSRC) communication scheme, a wireless access in vehicular environments (WAVE) communication scheme, or a wireless fidelity (WiFi) communication scheme.

The transmit-receive switch 112 may transmit a high frequency analog communication signal received from the transmitter 111 to the antenna apparatus 120 according to a control signal of the controller 130 and transmit the high frequency analog communication signal received from the antenna apparatus 120 to the receiver 113.

The receiver 113 may demodulate the high frequency analog communication signal into a low frequency analog communication signal using a high frequency signal of a local oscillator. In addition, the receiver 113 may convert the low frequency analog communication signal into digital communication data according to a control signal of the controller 130.

In the present disclosure, the controller 130 may be an electronic control unit (ECU).

The transmitter 111 may demodulate a high frequency analog communication signal using various communication schemes. For example, the transmitter 111 may use the same communication scheme as the above described communication scheme used by the receiver 113.

The antenna apparatus 120 includes an antenna 121 and a polarization adjuster 122.

The antenna 121 may emit an electromagnetic wave (a radio wave) corresponding to the high frequency analog communication signal into the free space, and in response to receiving an electromagnetic wave from the free space, output a high frequency analog communication signal corresponding to the received electromagnetic wave.

The antenna 121 may have various shapes and various sizes depending on the frequency of an analog signal and/or an electromagnetic wave to be transmitted and received through the antenna 121. For example, the antenna 32 may include a dipole antenna, a monopole antenna, a patch antenna, a parabola antenna, a helical antenna, a yagi antenna, a slot antenna, an array antenna, and the like.

The antenna 121 may emit a polarized wave that may vary depending on the operation of the polarization adjuster 122 to the free space, and may receive a polarized wave that may vary depending on the operation of the polarization adjuster 122 from the free space.

For example, the antenna 121 may be rotatably provided as shown in FIGS. 7A, 7B, 7C, and 7D, the antenna 121 may transmit and receive various polarized waves depending on the operation of the polarization adjuster 122.

Figure 7A:
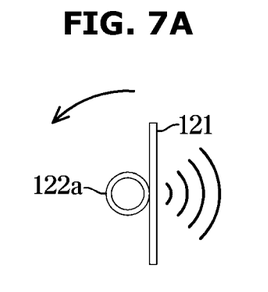
FIGS. 7A, 7B, 7C, and 7D illustrate examples of an antenna apparatus included in a vehicle according to an embodiment of the present disclosure.
Figure 7B:
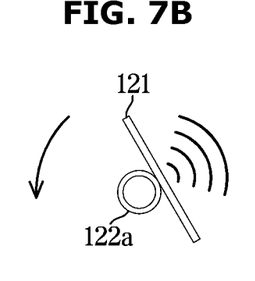
Figure 7C:
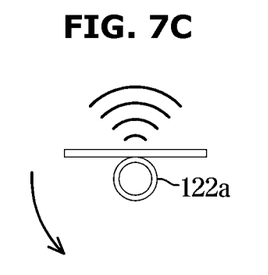
Figure 7D:
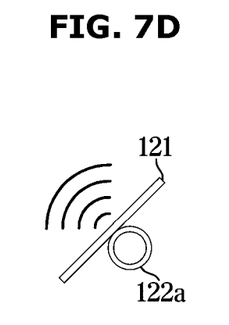
Figure 8:
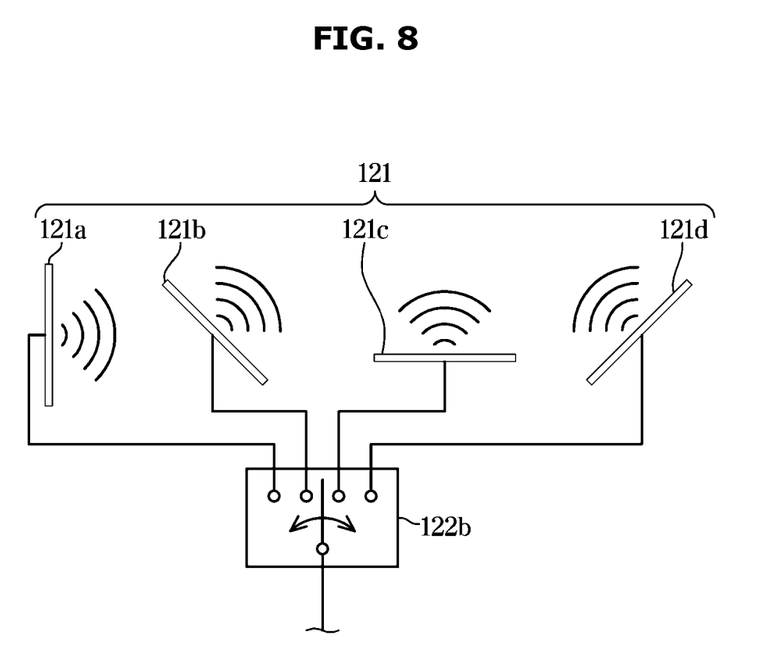
FIG. 8 illustrates another example of an antenna apparatus included in a vehicle according to another embodiment of the present disclosure.

In order to transmit and receive vertically polarized waves, the antenna 121 may be oriented in the 0 degree direction as shown in FIG. 7A. In order to transmit and receive +45 degree polarized waves, the antenna 121 may be oriented in the +45 degree direction as shown in FIG. 7B. In order to transmit and receive horizontally polarized waves, the antenna 121 may be oriented in the +90 degree direction as shown in FIG. 7C. In order to transmit and receive 135 degree polarized waves, the antenna 121 may be oriented in the +135 degree direction as shown in FIG. 7D.

Polarized waves that may be transmitted and received by the antenna 121 are not limited to those shown in FIGS. 7A, 7B, 7C, and 7D, and various polarized waves may be transmitted and received by the antenna 121 depending on the direction in which the antenna 121 is oriented.

As another example, the antenna 121 may include a plurality of polarization antennas 121a, 121b, 121c, and 121d as shown in FIG. 8. The plurality of polarization antennas 121a, 121b, 121c, and 121d may transmit and receive different polarized waves.

The plurality of polarization antennas 121a, 121b, 121c, and 121d include a vertical polarization antenna 121a for transmitting and receiving vertically polarized waves, the 45 degree polarization antenna 121b for transmitting and receiving 45 degree polarized waves, a horizontal polarization antenna 121c transmitting and receiving horizontally polarized waves, and a 135 degree polarization antenna 121d for transmitting and receiving 135-degree polarized waves.

The polarization adjuster 122 may adjust polarized waves emitted through the antenna 121 and received by the antenna 121.

For example, the polarization adjuster 122 may include a driving motor 122a that may rotate the antenna 121 as shown in FIGS. 7A, 7B, 7C, and 7D. The polarization adjuster 122 may rotate the antenna 121 in response to a polarization control signal of the controller 130.

As another example, the polarization adjuster 122 may include a switch 122b for selecting one of the plurality of polarization antennas 121a, 121b, 121c, and 121d as shown in FIG. 8. The polarization adjuster 122 may select one of the plurality of polarization antennas 121a, 121b, 121c, and 121d in response to a polarization control signal of the controller 130.

The controller 130 includes a processor 131 and a memory 132 for generating control signals for controlling the communicator 110 and the antenna apparatus 120.

The processor 131 may process a data frame received from the user device 10 through the communicator 110. The processor 131 may extract polarization data from the data frame received from the user device 10. The processor 131 may obtain information about the polarized wave that is emitted from the user device 10 from the polarization data. For example, the processor 131 may identify whether the polarized wave transmitted and received by the user device 10 is a vertically polarized wave or horizontally polarized wave.

The processor 131 may generate a polarization control signal for controlling the polarization adjuster 122 on the basis of the polarization data. For example, the processor 131 may output a polarization control signal for transmitting and receiving a vertically polarized wave on the basis of the polarization data, a polarization control signal for transmitting and receiving a 45-degree polarized wave, or a polarization control signal for transmitting and receiving a 135-degree polarized wave to the polarization adjuster 122.

The processor 131 may generate digital communication data to be transmitted to the user device 10 through the communicator 110. The digital communication data may include information to be transmitted from the vehicle 1 to the user device 10. For example, the digital communication data may include a response message for responding to a message of the user device 10, or may include a request message for requesting information regarding the motion of the user device 10.

As such, the processor 131 may control the polarized waves transmitted and received by the antenna apparatus 120 to match polarized waves transmitted and received by the user device 10 on the basis of information about the polarized waves transmitted and received to and from the user device 10.

The memory 132 may store instructions (programs) and data for controlling the operation of the vehicle 1, and may provide the stored program and data to the processor 131. For example, the memory 132 may store instructions (a program) and data for implementing the operations of the processor 131 described above.

The memory 132 may temporarily memorize a data frame received by the communicator 110 and temporarily memorize the data frame processed by the processor 131.

The memory 132 may include not only volatile memories such as an S-RAM and D-RAM, but also non-volatile memories such as flash memory, ROM, and EPROM.

As described above, the vehicle 1 may communicate with the user device 10 and may receive information about the polarized wave that is emitted from the user device 10 and may control the polarized wave transmitted and received by the antenna apparatus 120 to match the polarized wave of the user device 10.

Figure 9:
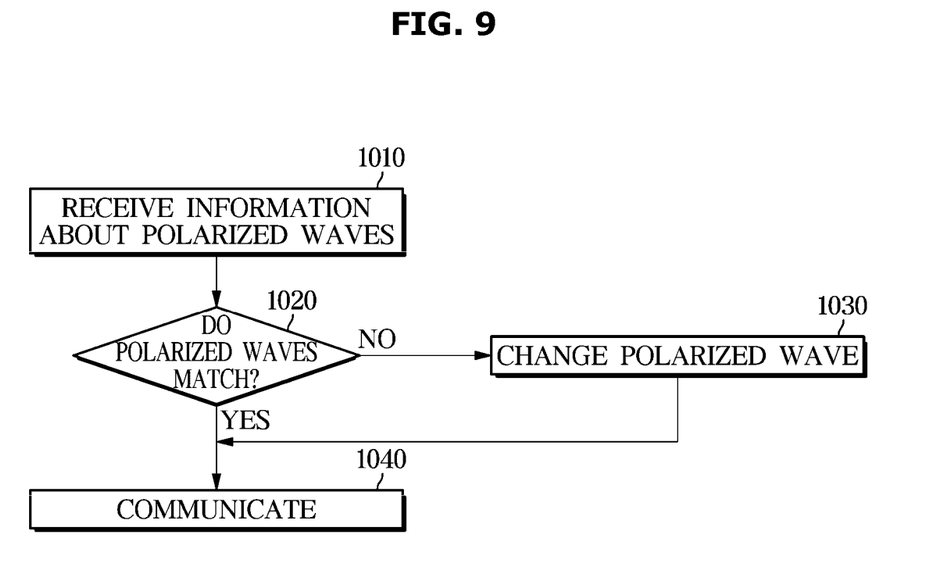
FIG. 9 illustrates the operation of a vehicle according to an embodiment of the present disclosure.

FIG. 9 illustrates the operation of a vehicle according to an embodiment.

Referring to FIG. 9, the vehicle 1 receives information about polarized waves from the user device 10 (S1010).

The user device 10 may transmit a data frame containing polarization data to the vehicle 1. The polarization data is generated on the basis of information about the movement and posture of the user device 10, and the polarization data may include information about polarized waves emitted from the user device 10.

The vehicle 1 may receive the data frame from the user device 10 and extract the polarization data from the data frame. The vehicle 1 may identify the polarized waves emitted from the user device 10 on the basis of the polarization data.

The vehicle 1 may determine whether the polarized wave emitted from the antenna apparatus 120 matches the polarized wave emitted from the user device 10 (S1020).

The vehicle 1 may identify the direction in which the antenna 121 included in the antenna apparatus 120 is oriented and identify the polarized wave emitted from the antenna apparatus 120 on the basis of the direction in which the antenna 121 is oriented.

The vehicle 1 may compare the polarized wave emitted from the antenna apparatus 120 with the polarized wave emitted from the user device 10.

The vehicle 1, when the polarized wave emitted from the antenna apparatus 120 does not match the polarized wave emitted from the user device 10 (No in S1020) changes the polarized wave that is emitted from the antenna apparatus 120 (S1030).

The vehicle 1 may control the polarization adjuster 122 of the antenna apparatus 120 to change the polarized wave emitted.

For example, when the polarization adjuster 122 includes the driving motor 122a that rotates the antenna 121, the controller 130 of the vehicle 1 may rotate the antenna 121 to be oriented in a direction corresponding to the polarized wave emitted from the user device 10 using the driving motor 122a.

For example, when the antenna apparatus 120 includes a plurality of polarization antennas 121a, 121b, 121c, and 121d, the controller 130 of the vehicle 1 may select a polarization antenna which is oriented in a direction corresponding to the polarized wave emitted from the user device 10 using the switch 122b.

The vehicle 1, when the polarized wave emitted from the antenna apparatus 120 matches the polarized wave emitted from the user device 10 (YES in S1020), communicates with the user device 10 (S1040).

When the polarized wave emitted from the antenna apparatus 120 matches the polarized wave emitted from the user device 10, the communication speed or communication quality with the user device 10 may be improved. Accordingly, the vehicle 1 may communicate with the user device 10 at a sufficient data transmission rate.

As described above, the vehicle 1 may receive information about the polarized waves emitted from the user device 10 and may control the polarized waves transmitted and received by the antenna apparatus 120 to match the polarized waves of the user device 10. In addition, when the polarized wave emitted from the antenna apparatus 120 matches the polarized wave emitted from the user device 10, the vehicle 1 may communicate with the user device 10.

As is apparent from the above, the vehicle including the antenna apparatus and the control method thereof can improve the communication efficiency with a pedestrian.

The vehicle including the antenna apparatus and the control method thereof can identify a polarized wave emitted from a user device according to the position and posture of the user device in the V2P communication.

The vehicle including the antenna apparatus and the control method thereof can control a polarized wave emitted from the antenna apparatus on the basis of a polarized wave emitted from a user device carried by a pedestrian in the V2P communication.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. The medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A vehicle comprising:
an antenna;
a polarization adjuster configured to change a first polarized wave emitted through the antenna; and
a controller configured to:
receive a wireless signal from a portable user device through the antenna;
identify a second polarized wave emitted from the portable user device based on the wireless signal; and
control the polarization adjuster such that the first polarized wave matches the second polarized wave,
wherein the antenna includes a plurality of polarization antennas and the polarization adjuster includes a switch configured to connect at least one of the plurality of polarization antennas to the controller,
wherein the controller controls the switch to connect a polarization antenna, through which a third polarized wave that matches the second polarized wave is emitted, among the plurality of polarization antennas to the controller.

2. The vehicle of claim 1, wherein the wireless signal received from the portable user device includes information about the second polarized wave.

3. The vehicle of claim 2, wherein the information about the second polarized wave is obtained from a posture of the portable user device.

4. The vehicle of claim 1, wherein the wireless signal received from the portable user device includes information about a posture of the portable user device.

5. The vehicle of claim 1, wherein the polarization adjuster includes a driving motor configured to rotate the antenna.

6. The vehicle of claim 5, wherein the controller controls the driving motor such that the first polarized wave matches the second polarized wave.

7. The vehicle of claim 1, wherein the controller determines whether the first polarized wave matches the second polarized wave.

8. The vehicle of claim 7, wherein the controller controls the polarization adjuster when the first polarized wave does not match the second polarized wave.

9. The vehicle of claim 7, wherein the controller processes the wireless signal from the portable user device when the first polarized wave matches the second polarized wave.

10. A method of controlling a vehicle, which includes an antenna and a polarization adjuster configured to change a first polarized wave emitted through the antenna, the method comprising steps of:
receiving a wireless signal from a portable user device through the antenna;
identifying a second polarized wave emitted from the portable user device based on the wireless signal; and
controlling the polarization adjuster such that the first polarized wave matches the second polarized wave,
wherein the step of controlling the polarization adjuster includes controlling a switch to select a polarization antenna, through which a third polarized wave that matches the second polarized wave is emitted, among a plurality of polarization antennas.

11. The method of claim 10, wherein the wireless signal received from the portable user device includes information about the second polarized wave.

12. The method of claim 11, wherein the information about the second polarized wave is obtained from a posture of the portable user device.

13. The method of claim 10, wherein the wireless signal received from the portable user device includes information about a posture of the portable user device.

14. The method of claim 10, wherein the step of controlling the polarization adjuster includes controlling such that the first polarized wave matches the second polarized wave.

15. The method of claim 10, further comprising a step of determining whether the first polarized wave matches the second polarized wave.

16. The method of claim 15, further comprising a step of controlling the polarization adjuster when the first polarized wave does not match the second polarized wave.

17. The method of claim 15, further comprising a step of processing the wireless signal from the portable user device when the first polarized wave matches the second polarized wave.

* * * * *